United States Patent
Salpietra

(10) Patent No.: US 9,612,023 B2
(45) Date of Patent: Apr. 4, 2017

(54) FILTERS, FILTER MOUNTS, AND METHODS OF MOUNTING FILTERS

(71) Applicant: Jordan Salpietra, Shreveport, LA (US)

(72) Inventor: Jordan Salpietra, Shreveport, LA (US)

(73) Assignee: EFIP Holdings LP, Shreveport, LA (US)

( * ) Notice: Subject to any disclaimer, the term of this patent is extended or adjusted under 35 U.S.C. 154(b) by 197 days.

(21) Appl. No.: 14/539,826

(22) Filed: Nov. 12, 2014

(65) Prior Publication Data

US 2015/0128804 A1    May 14, 2015

Related U.S. Application Data

(60) Provisional application No. 61/903,946, filed on Nov. 13, 2013.

(51) Int. Cl.
*F24C 15/20* (2006.01)
*B01D 46/00* (2006.01)
(Continued)

(52) U.S. Cl.
CPC .......... *F24C 15/2035* (2013.01); *B01D 45/08* (2013.01); *B01D 46/0002* (2013.01);
(Continued)

(58) Field of Classification Search
CPC . F24C 15/2035; B01D 46/0005; B01D 46/10; B01D 53/0438; B01D 53/0446;
(Continued)

(56) References Cited

U.S. PATENT DOCUMENTS 3,999,471 A * 12/1976 Bishop .................... F24F 13/06
428/582
4,031,180 A * 6/1977 Bohanon ................... F28C 1/04
261/106
(Continued)

FOREIGN PATENT DOCUMENTS

CA        2558445 A1 *  9/2005  .......... F24C 15/2035
CA        2558953 A1 *  3/2007  ............ B01D 45/06
(Continued)

OTHER PUBLICATIONS

DE 10241313 Translation.*

*Primary Examiner* — Amber R Orlando
*Assistant Examiner* — Britanny Precht
(74) *Attorney, Agent, or Firm* — Baker Botts L.L.P.

(57) ABSTRACT

A filter assembly includes: a filter pad including fibers selected from wool fibers, wood-based viscose fibers, and cellulose-based synthetic fibers, the fibers configured to absorb grease particulates; a baffle-type filter; and a support bracket configured to support the filter pad. The support bracket includes: a clip portion that is substantially u-shaped; an attachment portion including a mounting hole formed in a surface thereof; and a support portion arranged between the clip portion and the attachment portion, the support portion configured to support the disposable filter thereon. The filter assembly includes a hanging bracket configured to support the filter pad therein, the hanging bracket including a front wall, an attachment wall including a mounting hole formed in a surface thereof, and a top wall arranged between the front wall and attachment wall. The support bracket and the hanging bracket are configured to mount the filter assembly to an exhaust hood.

20 Claims, 13 Drawing Sheets

(51) Int. Cl.
*B01D 46/10* (2006.01)
*B01D 53/04* (2006.01)
*B01D 53/00* (2006.01)
*B01D 45/08* (2006.01)
*B01D 50/00* (2006.01)

(52) U.S. Cl.
CPC ......... *B01D 46/0005* (2013.01); *B01D 46/10* (2013.01); *B01D 50/002* (2013.01); *B01D 53/0407* (2013.01); *B01D 53/0438* (2013.01); *B01D 53/0446* (2013.01)

(58) Field of Classification Search
CPC ............ B01D 53/0407; B01D 46/0002; B01D 50/002; B01D 45/08
See application file for complete search history.

(56) References Cited

U.S. PATENT DOCUMENTS

| | | | | |
|---|---|---|---|---|
| 4,034,663 A * | 7/1977 | Jenn | ......................... | A47J 36/38 126/21 A |
| 4,089,258 A * | 5/1978 | Berger | ................ | A47J 37/0713 126/39 J |
| 4,389,352 A * | 6/1983 | Bohanon, Sr. | ............ | F24F 6/04 261/106 |
| 4,465,499 A * | 8/1984 | Wawro | ............... | B01D 46/0005 55/412 |
| 4,600,419 A * | 7/1986 | Mattison | ............. | B01D 46/001 55/484 |
| 4,889,542 A * | 12/1989 | Hayes | .................... | B01D 46/00 174/16.1 |
| 5,470,365 A * | 11/1995 | Jang | .................. | B01D 46/0005 55/510 |
| 5,837,022 A * | 11/1998 | Chapman | ........... | B01D 46/0006 55/496 |
| 6,058,929 A * | 5/2000 | Fritz | .................. | F24C 15/2035 126/299 D |
| 6,125,841 A * | 10/2000 | Boudreault | ............... | B08B 9/00 126/299 D |
| 6,182,653 B1 * | 2/2001 | Otenbaker | ............... | F24C 15/20 126/299 D |
| 6,241,794 B1 * | 6/2001 | Jadran | ................ | B01D 46/0004 55/480 |
| 6,371,106 B1 * | 4/2002 | Lambertson | ............ | F24C 15/20 126/299 D |
| 6,623,540 B2 * | 9/2003 | Clayton | ............. | B01D 46/0005 55/480 |
| 6,716,265 B2 * | 4/2004 | Hung | .................. | B01D 46/0002 454/139 |
| 6,942,710 B2 * | 9/2005 | Milano | ................ | B01D 46/008 55/480 |
| 7,575,617 B2 * | 8/2009 | Ferguson | ............... | B01D 46/10 454/309 |
| 2002/0174632 A1 * | 11/2002 | Chiang | ............. | B01D 46/0005 55/418 |
| 2003/0164093 A1 * | 9/2003 | Brownell | ............. | B01D 50/002 95/268 |
| 2005/0028498 A1 * | 2/2005 | Entezarian | ........... | B01D 50/002 55/320 |
| 2007/0023349 A1 * | 2/2007 | Kyllonen | ............. | F24C 15/2035 210/348 |
| 2007/0204854 A1 * | 9/2007 | Morton | ............... | F24C 15/2035 126/299 D |
| 2009/0194093 A1 * | 8/2009 | Aviles | .................... | B01D 45/06 126/299 E |
| 2014/0366496 A1 * | 12/2014 | Salpietra | ............ | F24C 15/2035 55/350.1 |
| 2015/0362196 A1 * | 12/2015 | Chen | .................... | B01D 45/08 55/437 |

FOREIGN PATENT DOCUMENTS

| | | | | |
|---|---|---|---|---|
| DE | 10241313 A1 * | 3/2004 | ......... | F24C 15/2035 |
| EP | 1826493 A2 * | 8/2007 | .......... | F24C 15/2035 |

* cited by examiner

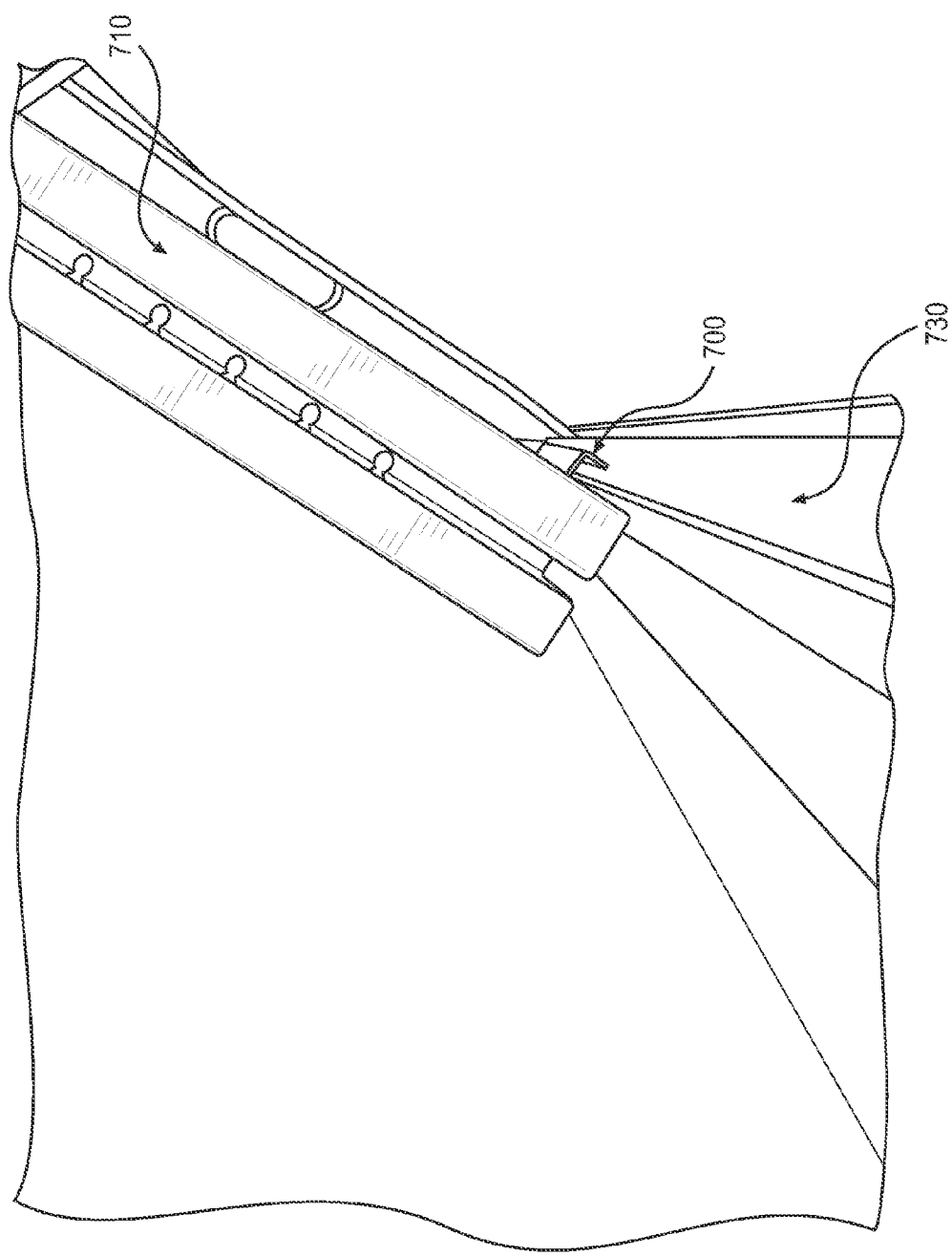

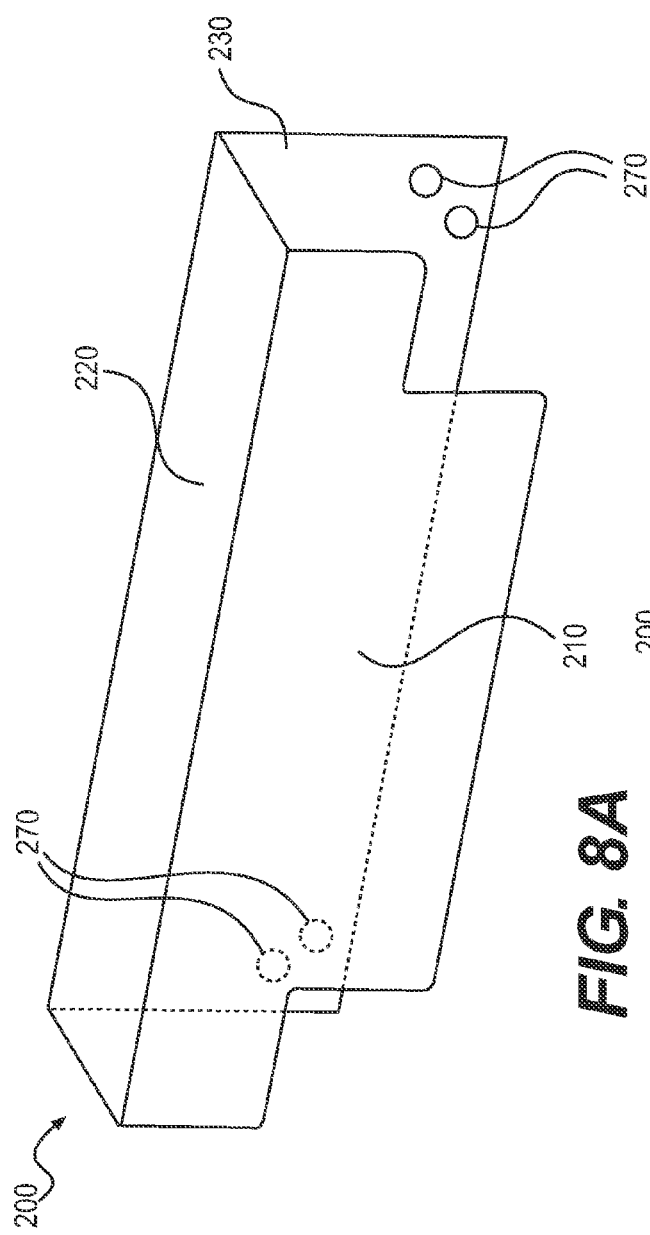
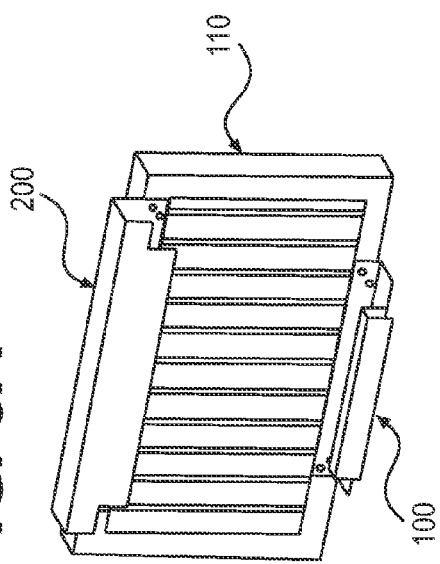
FIG. 8A
FIG. 8B

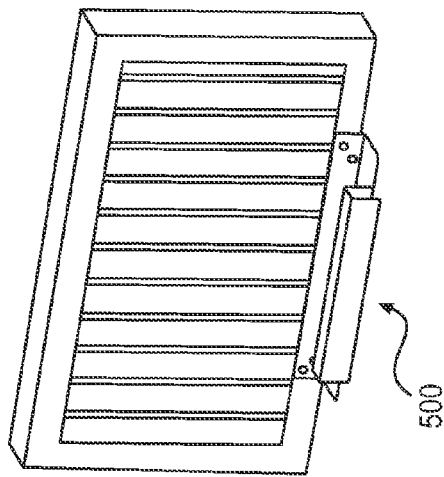
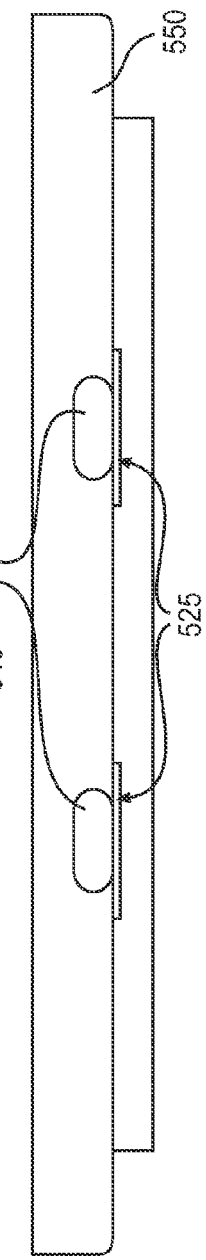
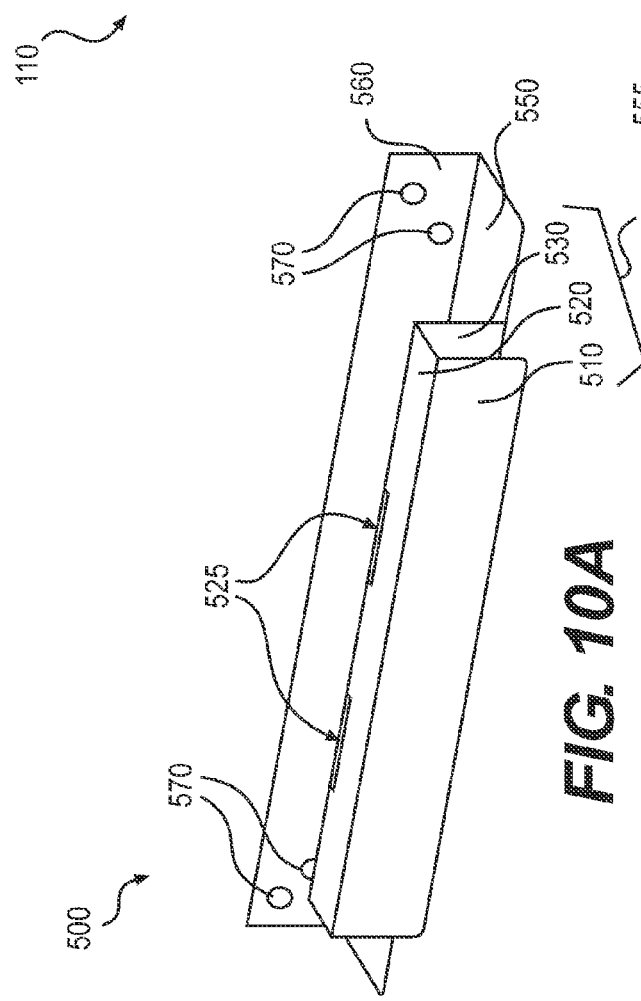

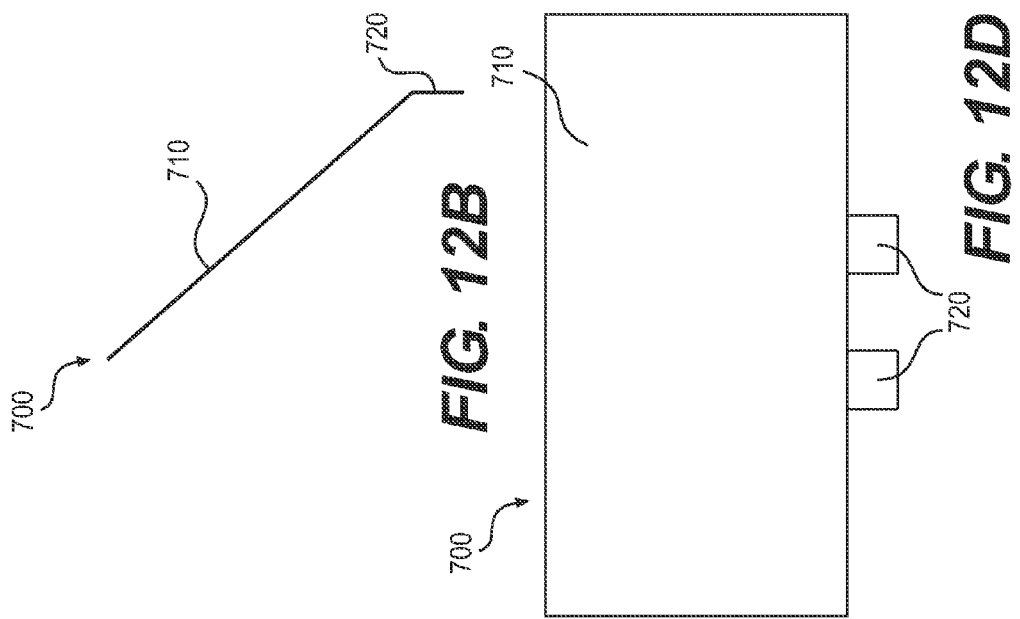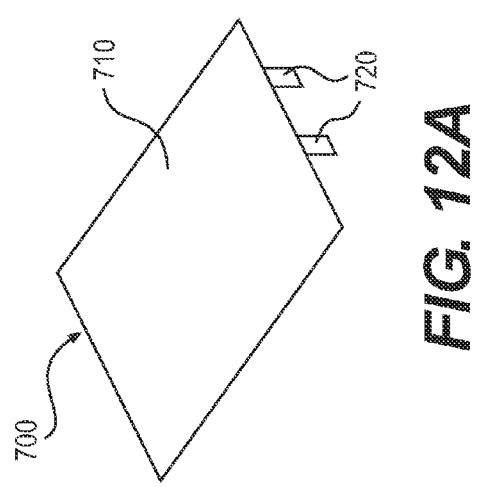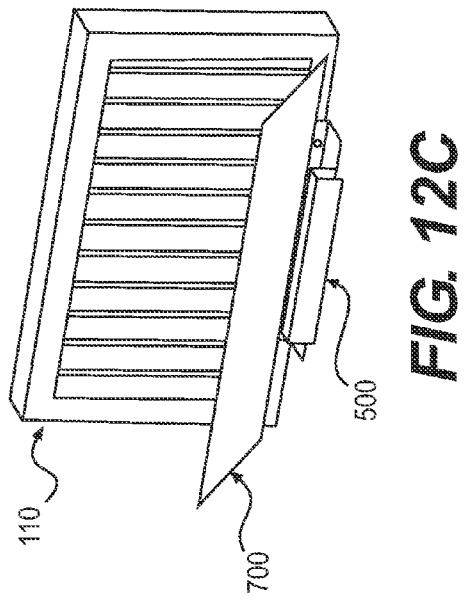

FILTERS, FILTER MOUNTS, AND METHODS OF MOUNTING FILTERS

CROSS-REFERENCE TO RELATED APPLICATION

This application claims the benefit of U.S. Provisional Patent Application No. 61/903,946 filed on Nov. 13, 2013, the disclosure of which is incorporated herein by reference in its entirety.

BACKGROUND OF THE INVENTION

Field of the Invention

The invention relates generally to filters, mounts or brackets for mounting filters, and methods of mounting filters.

SUMMARY OF THE INVENTION

Filters may be employed in canopies or hoods overlying relatively large grills, broilers, ranges, stoves and like equipment in kitchens, for example, in restaurants and other facilities where food is prepared. Such filters may be typically provided with a rectangular frame to which rows of baffles are secured in staggered relation to form a grease and/or flame retarding filter for a kitchen exhaust/ventilation system. Nevertheless, there remains a need for a disposable grease filter pad, which is removable and replaceable, and which may be used in conjunction with a separate UL1046 listed grease filter, or the like. The disposable grease filter pad may be in place for extracting grease from grease-laden exhaust air and removed for permitting direct cleaning of all filter surfaces.

Grease filters and/or grease removal devices may be installed in exhaust hoods above various types of cooking equipment including, for example, deep-fat fryers, grills, griddles, and ovens where excess heat and flame may occur. In applications using existing wool or fiber-based filters, problems may be encountered due to excessive heat or flame. Unless stainless steel heat shields are placed in front of the wool or fiber-based filters, there is the possibility that concentrations of heat (e.g., from exhaust of the cooking equipment) may degrade the wool and/or other fibers and cause a hole to form in the filter. Similarly, flames may make holes in the filter if they come in direct contact with the filter which occurs above griddles and grills with a grease flare-up. This is a major drawback since a hole in the filter renders it ineffective and requires that the filter be replaced.

Existing wool or fiber-based filters often require a separate support frame and an additional frame cover made of metal, which is both costly, labor intensive, heavy for the operator to use, and susceptible to damage, often requiring costly replacement. This assembly, often, along with an optional heat shield, causes the current wool-based system to be not only expensive to make but it can be difficult for the user to operate. In addition, wool or fiber-based filters may include a non-metallic support frame that is embedded inside of a filter mat, but this does not allow for reuse of the support frame, making the replacement filters very expensive for operations.

In an embodiment of the invention, a kitchen ventilation system may be provided that includes a food preparation apparatus such as a grill, a broiler, a range, a stove, or the like, and a canopy located above the apparatus for exhausting air rising upwardly from the apparatus and laden with grease and/or oil vapors. A grease filter according to embodiments of the invention may be mounted within a mouth of the canopy and may be removable therefrom for cleaning.

According to an embodiment of the invention, a filter assembly may include a reusable external support frame embedded with a filter pad, the reusable support frame being configured to provide support to the filter pad to maintain the filter pad in a generally flat configuration and the filter pad comprising fibers configured to absorb grease particulates such as, for example, wool fibers, wood-based viscose fibers, and cellulose-based synthetic fibers. The filter pad may be tucked into the reusable external support frame's backside edges.

In an embodiment of the invention, a filter assembly may include a filter pad comprising fibers including natural, synthetic, and/or hybrid fibers. The filter pad may be tucked into the respective edges of the non-combustible reusable support frame's backside edges. The reusable support frame may be configured to provide support to the filter pad to maintain the filter pad in a generally flat configuration. In accordance with a particular embodiment, the filter pad may be comprised of at least first and second fibrous mats being coupled together. This united filter pad may be tucked into the respective edges of the non-combustible reusable support frame's backside.

Thus, embodiments of the invention provide a filter assembly that is effective at removing or reducing grease particulates from grease laden air. Accordingly, baffle filters may remain cleaner for a longer period of time, thereby being an even more effective fire barrier since the fuel source (e.g., grease particulates) has been decreased from the airflow prior to reaching any baffle filters and/or ductwork. Accordingly, baffle filters may be protected from fire and damage, perform better, and remain cleaner for a longer period of time.

According to other embodiments of the invention, an attachable bracket may create an internal support for metal and fiber-based grease filters in commercial kitchen exhaust hoods, or the like. The bracket may be made of metal and may include perforated holes spaced throughout the trough of the bracket for draining of fats, oils, grease, or the like that may collect in the trough. The profile of the bracket may include a substantially u-shaped edge, which may function as a type of hanger or clip. The u-shaped edge may straddle the bottom, lip of the exhaust hood's aperture opening, and may be oriented so that the trough of the bracket is protruding downstream to the airflow. This configuration allows all types of grease filters to rest inside the aperture opening, without requiring any welding or structural modifications. The bracket may be easily removed for cleaning and/or maintenance, and may be mounted in place using a simple clip-on installation procedure, rivets, screws, welding, adhesive, or other attaching means.

In an embodiment of the invention, a bracket may create a support channel for grease filters, or the like, on the inside of an aperture opening of a commercial kitchen exhaust hood, or the like. The bracket may be configured to be attached to the front face-bottom side of a listed baffle grease filter or the like, and be configured to support itself, in addition to a disposable grease removal device (DGRD), in a commercial kitchen exhaust hood or the like. As depicted in FIGS. 7A and 7B, existing brackets 700 for mounting to a kitchen vent hood 730 do not have a channel or gap between the clip portion and the listed baffle grease filter 710, preventing a DGRD from being inserted. Drain holes may be placed in the channel or gap that a DGRD rests in, to help ensure proper grease drainage during use. The bracket or clip may be added to any sized listed baffle grease filter, which includes any height, width and thickness of the baffle grease filter.

In another embodiment of the invention, a process of mounting a filter comprises inserting a disposable grease filter inside the aperture opening of a commercial kitchen exhaust hood such that the installation process does not require welding or any other type of structural modification in the existing exhaust hood canopy. A process of mounting a filter comprises inserting a disposable grease filter in a filter channel of a bracket or clip coupled to a baffle-type grease filter.

In still another embodiment of the invention, a process of mounting a filter comprises placing a disposable grease pre-filter in front of a baffle-type grease filter and inside the aperture opening of a commercial kitchen exhaust hood. In such a configuration, no additional external or internal brackets or other attachment means are required to hold the disposable grease pre-filter in place.

Other objects, features, and advantages of the present invention are apparent to persons of ordinary skill in the art in view of the following detailed description of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

FIG. 7B is a side view of a known baffle filter with a mounting clip.

FIG. 8A is a perspective view of an upper bracket, including exemplary dimensions, according to an embodiment of the invention.

FIG. 8B is a perspective view of the upper bracket attached to a baffle filter along with the bracket, according to an embodiment of the invention.

FIG. 10A is a perspective view of a bracket, according to an embodiment of the invention.

FIG. 10B is a perspective view of a bracket attached to a baffle filter, according to an embodiment of the invention.

FIG. 10C is a top view of a bracket, according to an embodiment of the invention.

FIG. 12A is a perspective view of a heat deflector, according to an embodiment of the Invention.

FIG. 12B is a profile view of a heat deflector, according to an embodiment of the Invention.

FIG. 12C is a perspective view of a heat deflector installed on a bracket attached to a baffle filter, according to an embodiment of the invention.

FIG. 12D is a rear view of a heat deflector, according to an embodiment of the invention.

DETAILED DESCRIPTION OF EMBODIMENTS OF THE INVENTION

Figure 1:
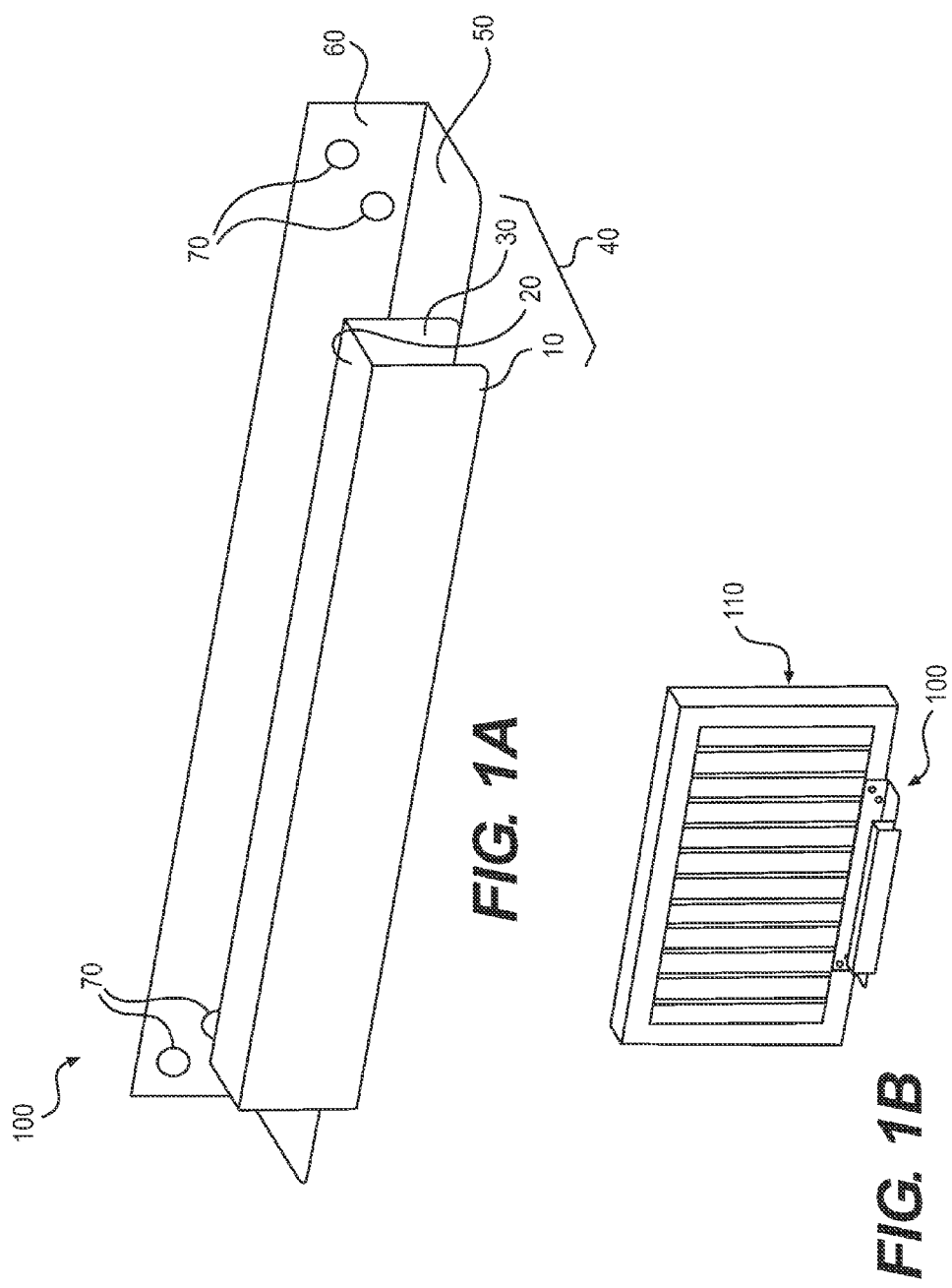
FIG. 1A is a perspective view of the bracket, including exemplary dimensions, according to an embodiment of the invention.
FIG. 1B is a perspective view of the bracket attached to a baffle filter, according to an embodiment of the invention.

Embodiments of the present invention, and their features and advantages, may be understood by referring to FIGS. 1-12D, like numerals being used for corresponding parts in the various drawings.

In an embodiment of the present invention, a clip-on bracket may fit inside of an exhaust hood's aperture opening, allowing the clip-on bracket to support any type of grease filter in place. The clip-on bracket may comprise a substantially u-shaped clip portion, configured to clip-on to a vertical or angled upright portion. The clip-on bracket may be designed to support grease filters in commercial kitchen exhaust hoods or the like, and may comprise a continuous and rigid sheet of metal that includes a plurality of bends in the metal. FIG. 1A depicts bracket 100, according to an embodiment of the invention. Bracket 100 may include clip portion 40, configured to be mounted or clipped to an exhaust hood, or the like. Clip portion 40 may include a first side wall 10, a top wall 20, and a second side wall 30. First side wall 10 may be substantially perpendicular to top wall 20. First side wall 10 may be substantially parallel to second side wall 30. Second side wall 30 may be substantially perpendicular to top wall 20. In alternative embodiments, the walls 10-30 may comprise a single, curved wall, may meet at non-right angles or may be at least partially curved. In addition, first side wall 10 may have rounded corners and a de-burred edge. In alternative embodiments, side wall 10 may have straight corners or cut-off corners.

Bracket 100 may further comprise a support wall 50 and an attachment wall 60. Support wall 50 may be configured to hold therein an edge or side of a disposable grease filter 120, such that the disposable grease filter 120 is supported by bracket 100. Thus, for example, the width or depth of support wall 50 may correspond to the width or depth of a disposable grease filter 120 to be mounted. Attachment wall 60 may comprise a mounting hole 70, which may be used in coupling bracket 100 to a baffle filter 110. Attachment wall 60 may comprise a plurality of mounting holes 70, which may include a mounting hole at one end of attachment wall 60 and another mounting hole at an opposite end of attachment wall 60. In another embodiment of the invention, a plurality of mounting holes 70 may be formed in each of the one end and the opposite end of attachment wall 60.

FIG. 1B depicts bracket 100 attached to a baffle filter 110, according to an embodiment of the invention. Bracket 100 may be attached to baffle filter 110 via screws, bolts, nails, rivets, adhesive, welding, or other attachment means. Bracket 100 may be attached to a lower front portion of baffle filter 110. Bracket 100 may be positioned substantially in the center of the lower front portion of baffle filter 110 or may be offset on the lower front portion of baffle filter 110.

Figure 2:
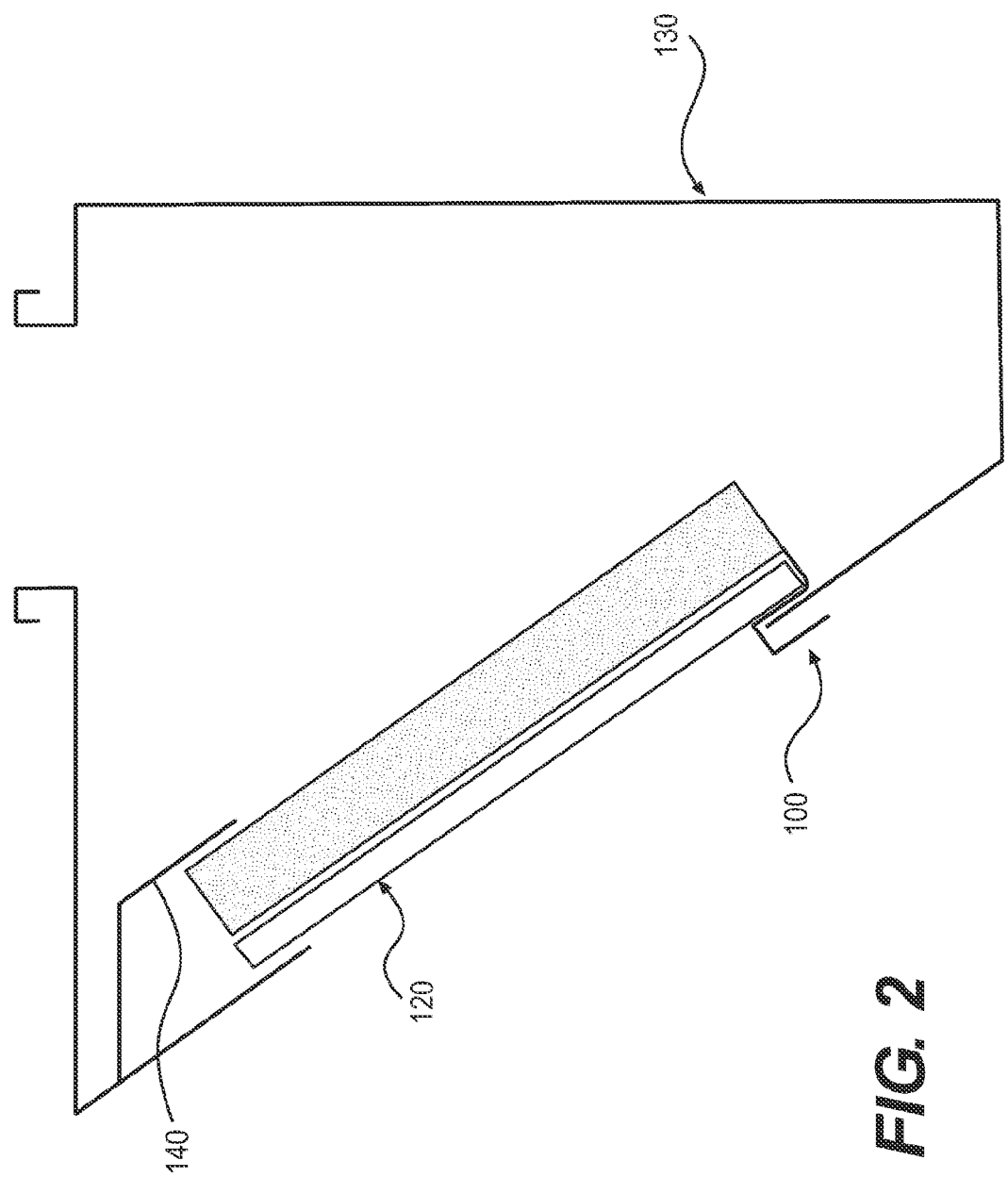
FIG. 2 is a side view of the disposable grease filter supported by the bracket attached to the baffle filter with the filter assembly mounted to an exhaust hood via the bracket, according to an embodiment of the invention.
Figure 3:
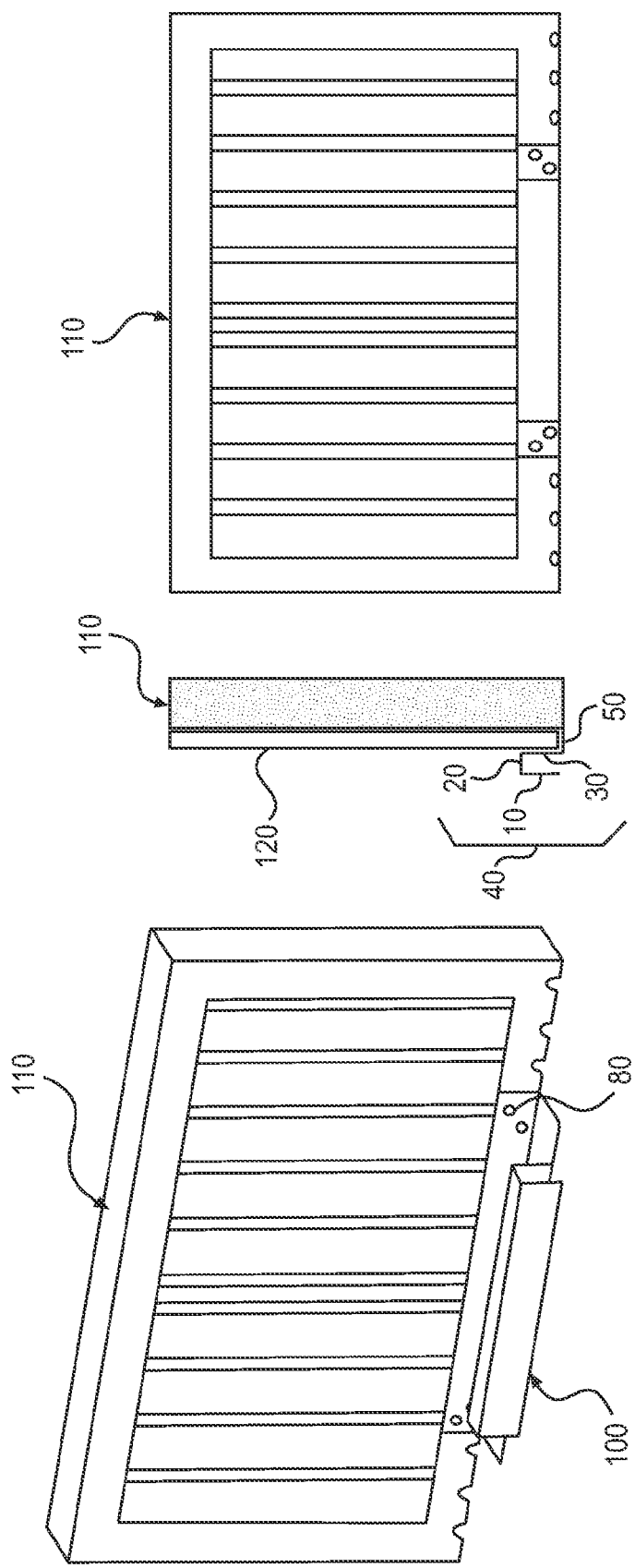
FIG. 3A is an isometric view of the bracket attached to the baffle filter, according to an embodiment of the invention.
FIG. 3B is a profile view of the bracket supporting the disposable grease filter and attached to the baffle filter, according to an embodiment of the invention.
FIG. 3C is a front view of the bracket attached to the baffle filter, according to an embodiment of the invention.

FIG. 2 depicts disposable grease filter 120 supported by bracket 100, which is attached to baffle filter 110, with the filter assembly mounted to an exhaust hood 130 via bracket 100, according to an embodiment of the invention. The filter assembly may include disposable grease filter 120 and baffle filter 110, and may be mounted to exhaust hood 130 such that an upper portion of the filter assembly may be at least partially held in place by a support portion 140. Bracket 100 may be mounted to exhaust hood 130 such that the airflow may travel from outside exhaust hood 130 to inside exhaust hood 130, passing through disposable grease filter 120 and then baffle filter 110. In other words, disposable grease filter 120 may be positioned facing outwardly with respect to exhaust hood 130 and baffle filter 110, when bracket 100 is mounted to exhaust hood 130. In an embodiment, disposable grease filter 120 and baffle filter 110 may be mounted at a predetermined angle from the horizontal axis. For example, the predetermined angle may be in the range of 10 degrees to 90 degrees. In another embodiment, disposable grease filter 120 and baffle filter 110 may be mounted such that they are substantially horizontal.

FIG. 3A depicts bracket 100 attached to baffle filter 110, according to an embodiment of the invention. As depicted, bracket 100 may be attached to baffle filter 110 via a plurality of rivets 80. FIG. 3B depicts bracket 100 supporting disposable grease filter 120 and attached to baffle filter 110, according to an embodiment of the invention. As depicted, bracket 100 may include clip portion 40, which may comprise first side wall 10, top wall 20, and second side wall 30. Further, bracket 100 may include support wall 50. Clip portion 40 may be configured to clip or be mounted on an exhaust hood. Support wall 50 may be configured to support a disposable grease filter 120 and may form a plane with the bottom edge of baffle filter 110. In alternative embodiments, support wall 50 may extend above or below the bottom edge of baffle filter 110. FIG. 3C depicts a front view of bracket 100 attached to baffle filter 110, according to an embodiment of the invention. Bracket 100 may be attached to baffle filter 110, for example, such that no portion of bracket 100 extends below the bottom edge of baffle filter 110. Bracket 100 may be attached to baffle filter 110 such that no portion of bracket 100 extends beyond the outer frame of baffle filter 110.

Figure 4:
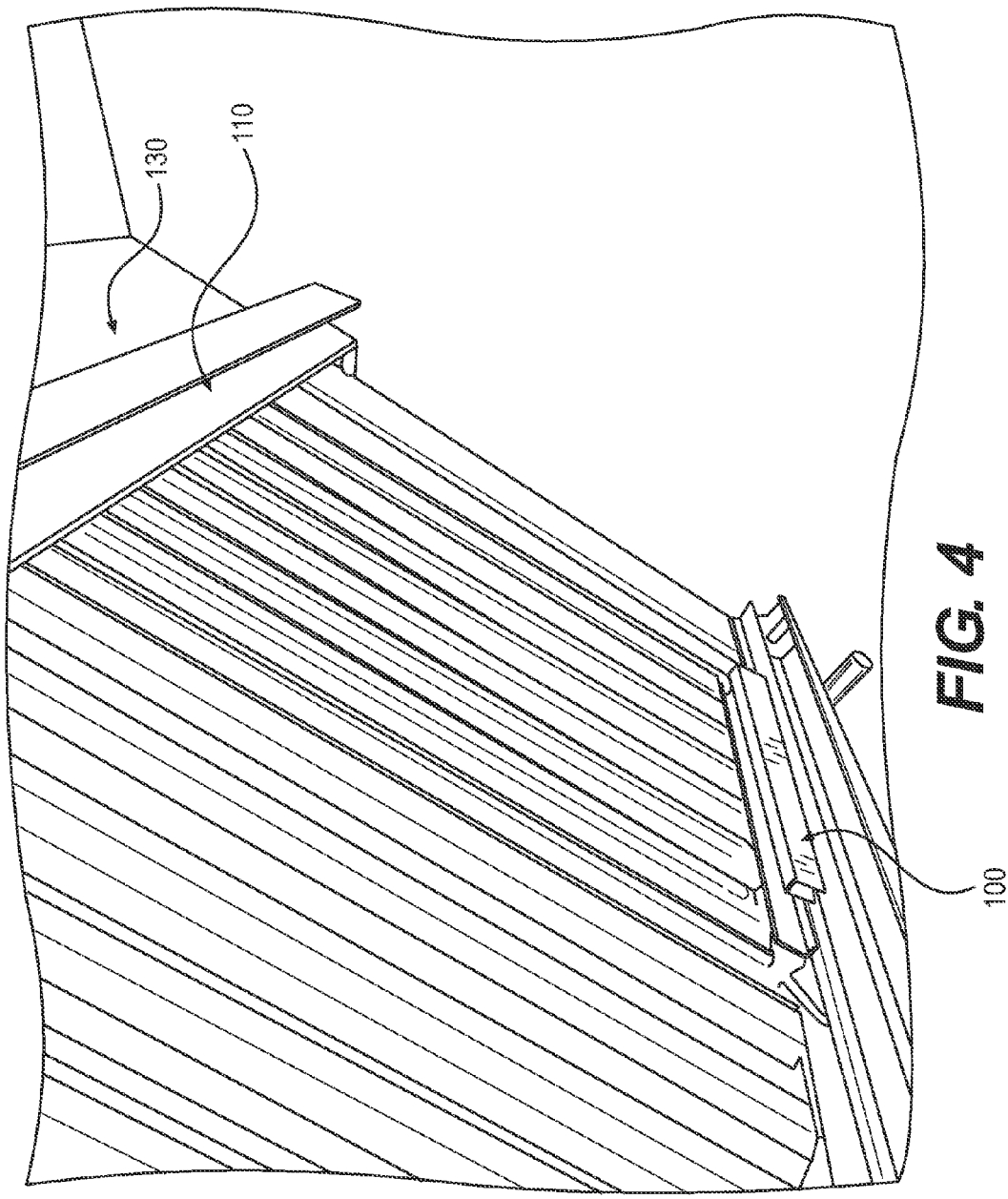
FIG. 4 is a perspective view of the bracket attached to the baffle filter and mounted to an exhaust, hood, according to an embodiment of the invention.
Figure 5:
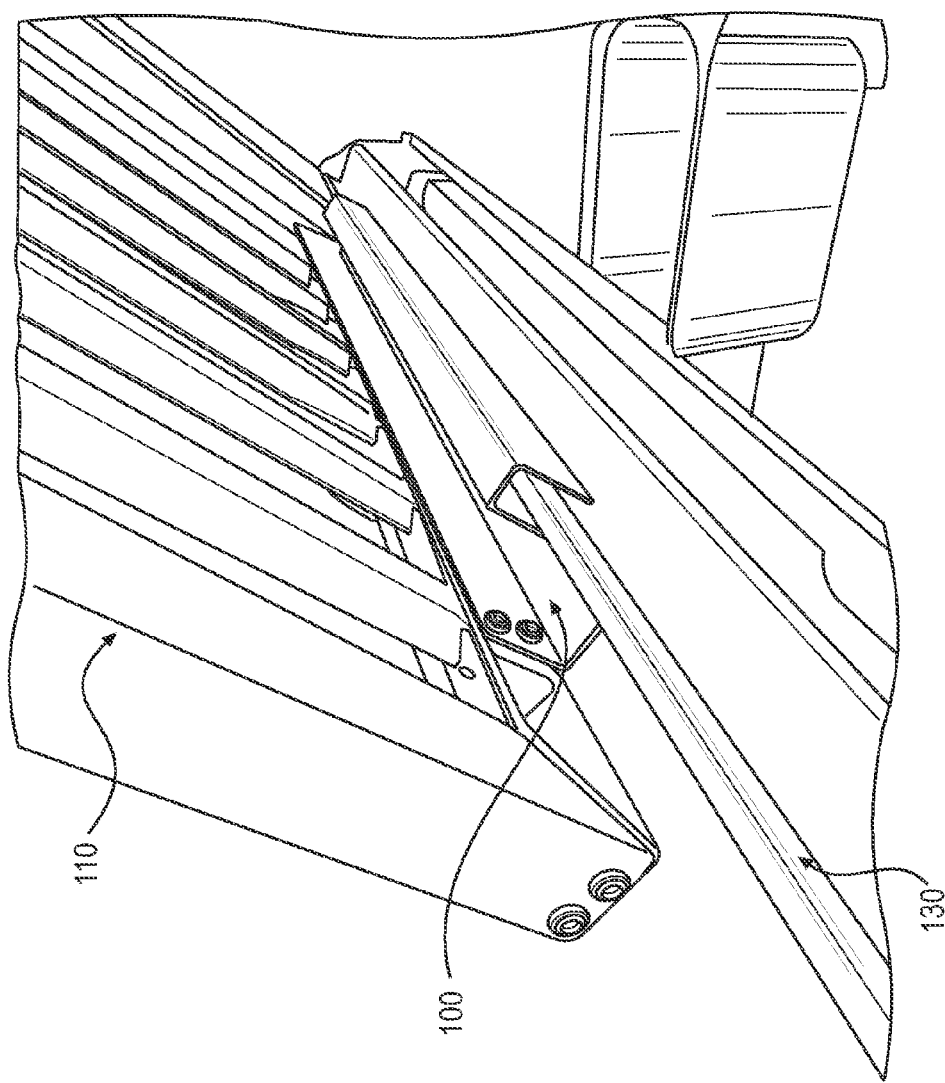
FIG. 5 is an enlarged view of the bracket attached to the baffle filter and mounted to an exhaust hood, according to an embodiment of the invention.

FIG. 4 depicts bracket 100 attached to baffle filter 110 and mounted to exhaust hood 130, according to an embodiment of the invention. Bracket 100 may mount to exhaust hood 130 at an entry or opening of exhaust hood 130, such that baffle filter 110 may be positioned adjacent to the entry or opening of exhaust hood 130. FIG. 5 is an enlarged view of bracket 100 attached to baffle filter 110 and mounted to exhaust hood 130. As depicted, bracket 100 may be configured to clip or attach to a lip or edge of exhaust hood 130, such that baffle filter 110 is mounted to exhaust hood 130 via bracket 100. Thus, the filter assembly may be easily attached to, and removed from, exhaust hood 130. This easy attachment and removal may allow for easy cleaning, maintenance, or replacement of the filter and exhaust hood.

Figure 6:
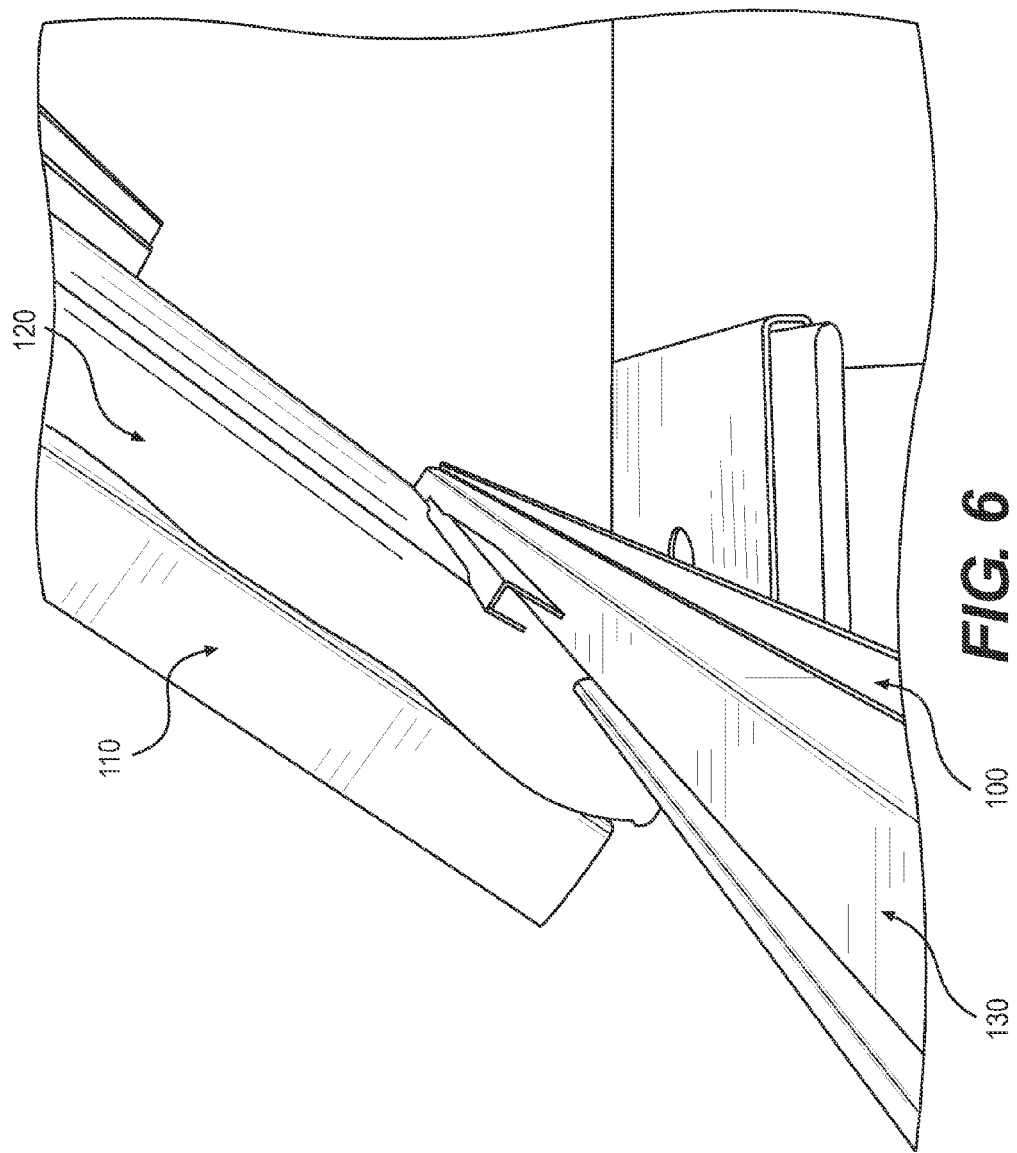
FIG. 6 is a side perspective view of the bracket supporting the disposable grease filter and attached to the baffle filter with the filter assembly mounted to an exhaust hood via the bracket, according to an embodiment of the invention.
Figure 7A:
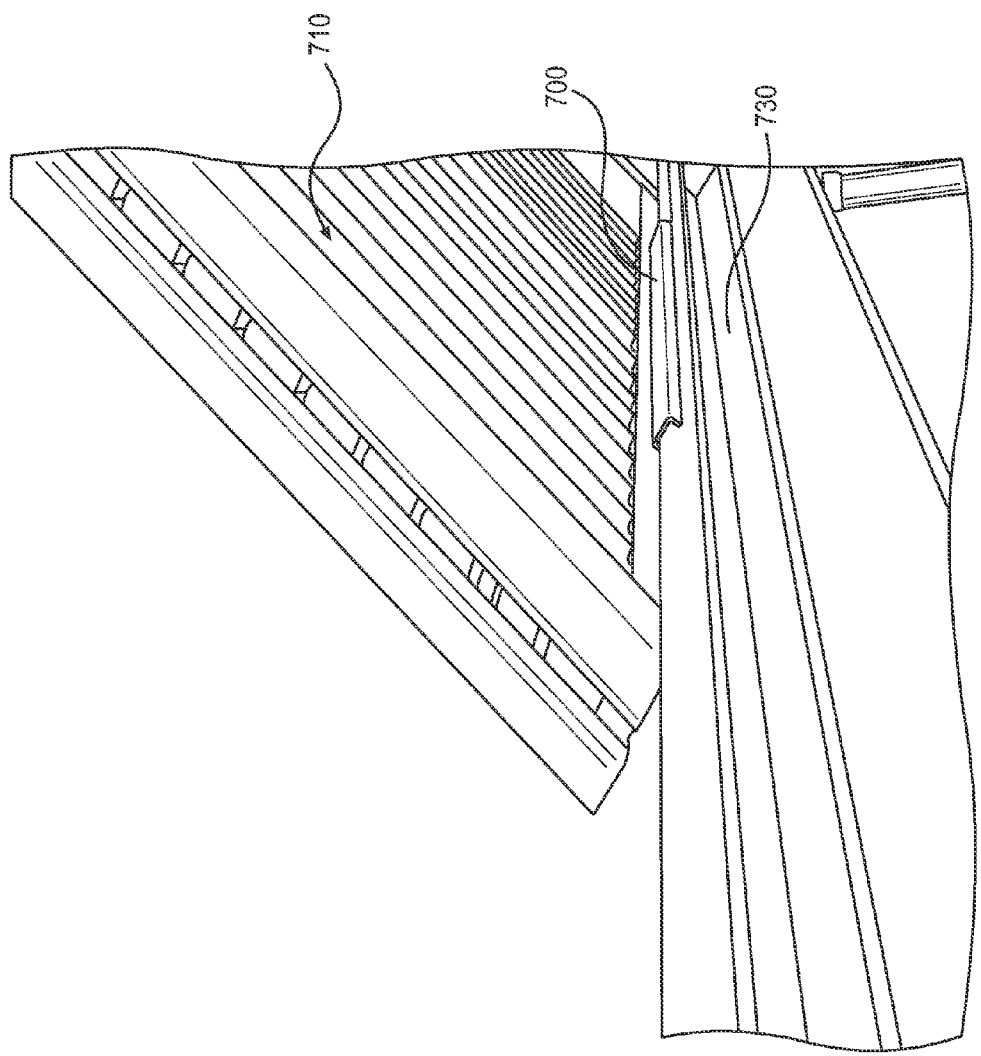
FIG. 7A is a perspective view of a known baffle filter with a mounting clip.

FIG. 6 depicts bracket 100 supporting disposable grease filter 120 and attached to baffle filter 110 with the filter assembly mounted to exhaust hood 130 via bracket 100, according to an embodiment of the invention. Disposable grease filter 120 may be supported by the channel formed in bracket 100 that is attached to baffle filter 110. Thus, disposable grease filter 120 may be disposed adjacent to baffle filter 110 at the entry or opening of exhaust hood 130. This configuration may allow for easy insertion, removal, and replacement of disposable grease filter 120.

In an embodiment of the invention, an upper bracket 200 may also be attached to baffle filter 110. FIG. 8A depicts upper bracket 200, including exemplary dimensions, according to an embodiment of the invention. Upper bracket 200 may be configured to be mounted or clipped to an exhaust hood, or the like. Upper bracket 200 may include a first side wall 210, a top wall 220, and a second side wall 230. First side wall 210 may be substantially perpendicular to top wall 220. First side wall 210 may be substantially parallel to second side wall 230. Second side wall 230 may be substantially perpendicular to top wall 220. In alternative embodiments, the walls 210-230 may comprise a single, curved wall, may meet at non-right angles, or may be at least partially curved. In addition, first side wall 210 may have rounded corners and a de-burred edge. In alternative embodiments, side wall 210 may have straight corners or cut-off corners. Moreover, first sidewall 210 may have cutout portions at the lower right and lower left portions, such that first sidewall 210 may be substantially T-shaped.

Top wall 220 may be configured to hold therein an edge or side of a disposable grease filter 120, such that the disposable grease filter 120 is supported by upper bracket 200. Thus, for example, the width or depth of top wall 220 may correspond to the width or depth of a disposable grease filter 120 to be mounted. Second side wall 230 may comprise a mounting hole 70, which may be used in coupling upper bracket 200 to a baffle filter 110. Second side wall 230 may comprise a plurality of mounting holes 70, which may include a mounting hole at one end of second side wall 230 and another mounting hole at an opposite end of second side wall 230. In another embodiment of the invention, a plurality of mounting holes 70 may be formed in the one end and the opposite end of second side wall 230. In addition, first side wall 210, top wall 220, and second side wall 230 may be configured to clip or mount to an exhaust hood 130 while allowing space for disposable grease filter 120 to also be supported by upper bracket 200.

FIG. 8B depicts upper bracket 200 attached to baffle filter 110 along with bracket 100, according to an embodiment of the invention. Upper bracket 200 may be attached to baffle filter 110 via screws, bolts, nails, rivets, adhesive, welding, or other attachment means. Upper bracket 200 may be attached to an upper front portion of baffle filter 110. Upper bracket 200 may be positioned substantially in the center of the upper front portion of baffle filter 110 or may be offset on the upper front portion of baffle filter 110.

Figure 9:
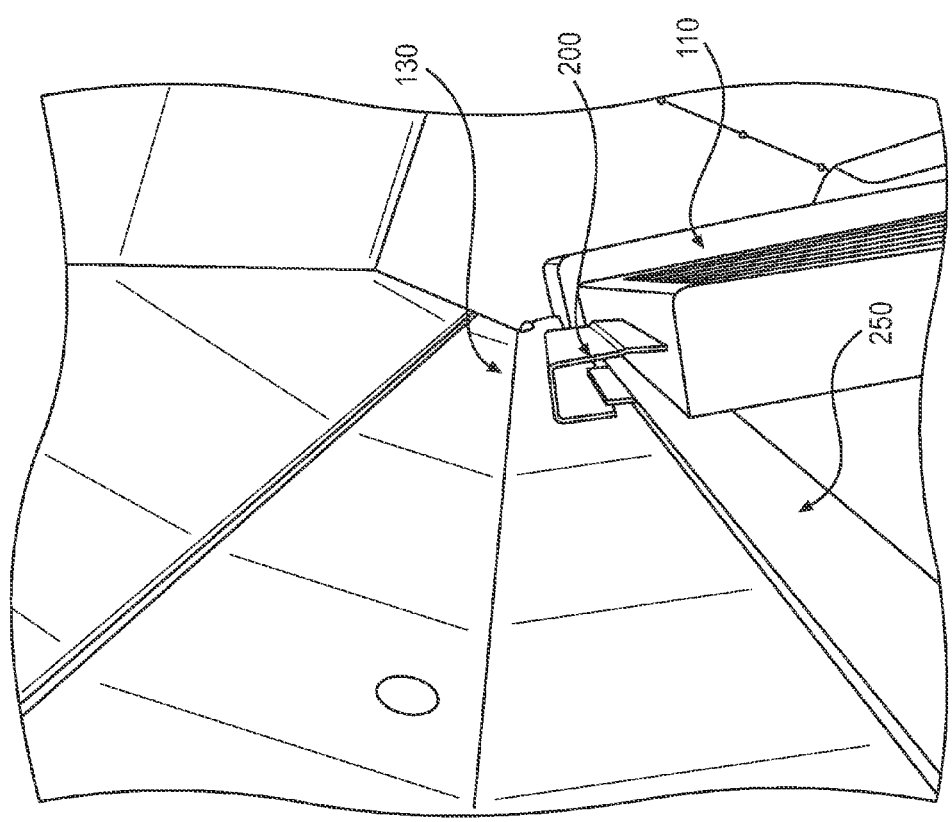
FIG. 9 is a side perspective view of the upper bracket attached to the baffle filter and mounted to an exhaust hood, according to an embodiment of the invention.

FIG. 9 depicts upper bracket 200 attached to baffle filter 110 and mounted to exhaust hood 130, according to an embodiment of the invention. Upper bracket 200 may mount to exhaust hood 130 such that it clips or rests on a lip or edge 250 of exhaust hood 130. Thus, baffle filter 110 may be positioned adjacent to the entry or opening of exhaust hood 130.

FIG. 10A depicts a perspective view of a bracket 500, according to an embodiment of the invention. Bracket 500 may include clip portion 540, configured to be mounted or clipped to an exhaust hood, or the like. Clip portion 540 may include a first side wall 510, a top wall 520, and a second side wall 530. First side wall 510 may be substantially perpendicular to top wall 520. First side wall 510 may be substantially parallel to second side wall 530. Second side wall 530 may be substantially perpendicular to top wall 520. In alternative embodiments, the walls 510-530 may comprise a single curved wall, may meet at non-right angles, or may be at least partially curved. In addition, first side wall 510 may have rounded corners and a de-burred, edge. In alternative embodiments, first side wall 510 may have straight corners or cut-off corners.

Bracket 500 may further include a support wall 550 and an attachment wall 560. Support wall 550 may be configured to hold therein an edge or side of a disposable grease filter 120, such that the disposable grease filter 120 is supported by bracket 500. Thus, for example, the width or depth of support wall 550 may correspond to the width or depth of a disposable grease filter 120 to be mounted. Attachment wall 560 may comprise a mounting hole 570, which may be used in coupling bracket 500 to a baffle filter 110. Attachment wall 560 may comprise a plurality of mounting holes 570, which may include a mounting hole at one end of attachment wall 560 and another mounting hole at an opposite end of attachment wall 560. In another embodiment of the invention, a plurality of mounting holes 570 may be formed in each of the one end and the opposite end of attachment wall 560.

In addition, bracket 500 may include an attachment slot 525 formed in top wall 520. In alternative embodiments, bracket 500 may comprise a plurality of attachment slots 525 formed in top wall 520. Attachment slot 525 may be configured to receive an attachment tab of a heat deflector, described in more detail below. In alternative embodiments, an attachment slot 525 or a plurality of attachment slots 525 may be formed in a different wall of bracket 500 (e.g., first side wall 510, second side wall 530, support wall 550).

FIG. 10B depicts bracket 500 attached to a baffle filter 110, according to an embodiment of the invention. Bracket 500 may be attached to baffle filter 110 via screws, bolts, nails, rivets, adhesive, welding, or other attachment means. Bracket 500 may be attached to a lower front portion of baffle filter 110. Bracket 500 may be positioned substantially in the center of the lower front portion of baffle filter 110 or may be offset on the lower front portion of baffle filter 110.

FIG. 10C depicts a top view of bracket 500, according to an embodiment of the invention. Bracket 500 may further include a drain hole 555 formed in support, wall 550. In alternative embodiments, bracket 500 may comprise a plurality of drain holes 555 formed in
support wall 550. Drain hole 555 may be configured to allow for the drainage of accumulated fats, oils, grease, water, or the like. Further, drain hole 555 may be substantially shaped as an ellipse or may take any other conceivable shape, e.g., circular, rectangular, square, triangular, semicircular, polygonal, or the like.

Figure 11A:
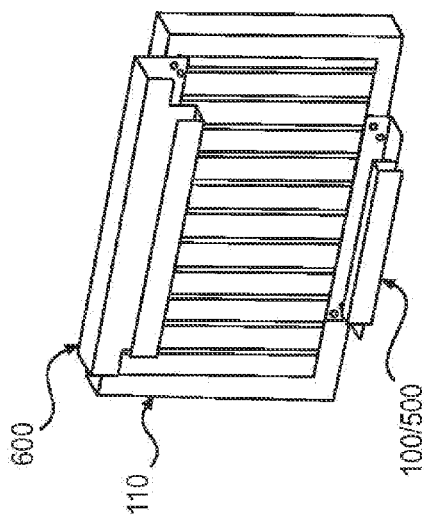
FIG. 11A is a perspective view of an upper bracket, according to an embodiment of the invention.

FIG. 11A depicts a perspective view of an upper bracket 600, according to an embodiment of the invention. Upper bracket 600 may be configured to be mounted or clipped to an exhaust hood, or the like. Upper bracket 600 may include a clip portion 640. Clip portion 640 may include a first side wall 610, a bottom wall 620, and a second side wall 630. Upper bracket 600 may further include a top wall 650 and an attachment wall 660.

First side wall 610 may be substantially perpendicular to bottom wall 620. First side wall 610 may be substantially parallel to second side wall 630. Second side wall 630 may be substantially perpendicular to bottom wall 620. In alternative embodiments, the walls 610-630 may comprise a single curved wall, may meet at non-right angles, or may be at least partially curved. In addition, first side wall 610 may have rounded corners and a de-burred edge. In alternative embodiments, first side wall 610 may have straight corners or cut-off corners. Moreover, second sidewall 630 may have cutout portions at the lower right and lower left portions, such that second sidewall 630 may be substantially T-shaped. Further, attachment wall 650 may be substantially parallel to second side wall 630 and substantially perpendicular to top wall 650. In alternative embodiments, the walls 610-630 may comprise a single curved wall, may meet at non-right angles, or may be at least partially curved.

The width of top wall 650 may be configured to correspond to the thickness of a disposable grease filter 120 to be mounted, such that the disposable grease filter 120 fits between second side wall 630 and attachment wall 660. Attachment wall 660 may include a mounting hole 670, which may be used in coupling upper bracket 600 to baffle filter 110. In alternative embodiments, attachment wall 660 may include a plurality of mounting holes 670, which may include a mounting hole at one end of attachment wall 660 and another mounting hole at an opposite end of attachment wall 660. In alternative embodiments of the invention, a plurality of mounting holes 670 may be formed in each of the one end and the opposite end of attachment wall 660. In addition, first side wall 610, bottom wall 620, and second side wall 630 may be configured to clip or mount to an exhaust hood 130, with the configuration of upper bracket 600 also allowing space for disposable grease filter 120 to be supported by upper bracket 600.

Figure 11B:
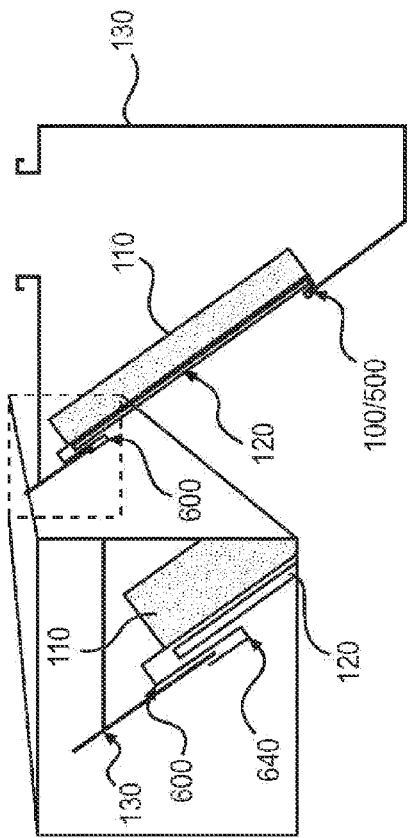
FIG. 11B is a perspective view of a baffle filter with a bracket and an upper bracket attached, according to an embodiment of the invention.

FIG. 11B depicts a perspective view of baffle filter 110 with bracket 100/500 and upper bracket 600 attached thereto, according to an embodiment of the invention. Upper bracket 600 may be attached to baffle filter 110 via screws, bolts, nails, rivets, adhesive, welding, or other attachment means. Upper bracket 600 may be attached to an upper front portion of baffle filter 110. Upper bracket 600 may be positioned substantially in the center of the upper front portion of baffle filter 110. Alternatively, upper bracket 600 may be positioned offset of center on the upper front portion of baffle filter 110.

Figure 11C:
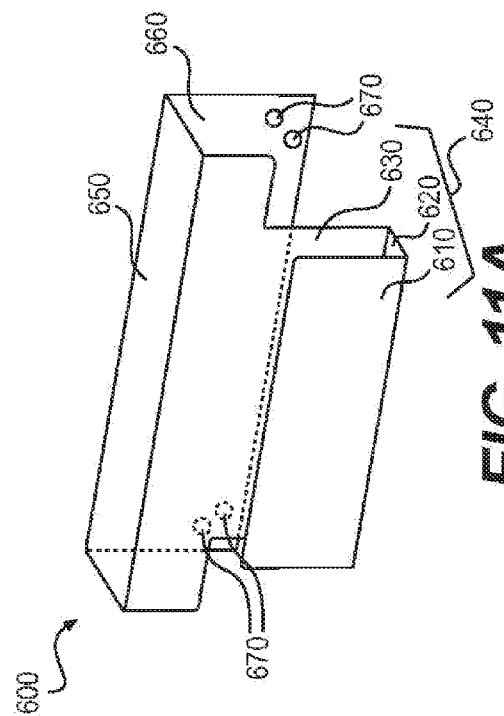
FIG. 11C is a side view of a bracket and upper bracket attached to a baffle filter with a disposable grease filter installed, according to an embodiment of the invention.

FIG. 11C depicts a side view of bracket 100/500 and upper bracket 600 attached to baffle filter 110 with disposable grease filter 120 installed, according to an embodiment of the invention. As depicted, disposable grease filter 120 may be held within bracket 100/500 and upper bracket 600, each of which are attached to baffle filter 110. Further, clip portion 640 maybe configured to clip or be mounted on an exhaust hood.

Figure 11D:
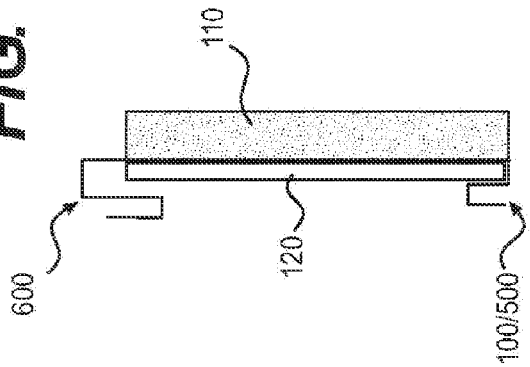
FIG. 11D is a side view of a disposable grease filter supported by a bracket and upper bracket attached to the baffle filter with the filter assembly mounted to an exhaust hood via the bracket and upper bracket, according to an embodiment of the invention.

FIG. 11D depicts a side view of disposable grease filter 120 supported by a bracket 100/500 and upper bracket 600 attached to baffle filter 110 with the filter assembly mounted to exhaust hood 130 via bracket 100/500 and upper bracket 600, according to an embodiment of the invention. Each of bracket 100/500 and upper bracket 600 may be mounted to exhaust hood 130 such that the airflow may travel from outside exhaust hood 130 to inside exhaust hood 130, passing through disposable grease filter 120 and then baffle filter 110. In other words, disposable grease filter 120 may be positioned facing outwardly with respect to exhaust hood 130 and baffle filter 110, when bracket 100/500 and upper bracket 600 are mounted to exhaust hood 130.

As depicted in the detail portion of FIG. 11D, clip portion 640 may be configured to attach to exhaust hood 130, for example, by hooking over a front face of exhaust hood 130 near or adjacent to an aperture opening of exhaust hood 130 through which air flows. In certain embodiments, disposable grease filter 120 and baffle filter 110 may be mounted at a predetermined angle from the horizontal axis. For example, the predetermined angle may be in the range of 10 degrees to 90 degrees. In other embodiments, disposable grease filter 120 and baffle filter 110 may be mounted such that they are substantially horizontal.

FIG. 12A depicts a perspective view of a heat deflector 700, according to an embodiment of the invention. Heat deflector 700 may include a generally flat rectangular body portion 710 and a mounting tab 720. In certain embodiments, heat deflector 700 may include a plurality of mounting tabs 720. Each mounting tab 720 may be configured to enter or be attached to an attachment slot 525 in bracket 500, as described above. In this manner, mounting tab 720 may be configured to mount into attachment slot 525, thereby attaching heat deflector 700 to bracket 500, which may be attached to baffle filter 110.

In alternative embodiments, body portion 710 of heat deflector 700 may take alternative shapes, e.g., circular, square, triangular, semicircular, polygonal, or the like. Further, in alternative embodiments, heat deflector 700 may have an angled or curved body portion 710, the cross-section of which may also take different shapes, e.g., circular, square, triangular, semicircular, polygonal, or the like. Heat deflector 700 may comprise, for example, a metallic material, such as stainless steel, aluminum, galvanized metal, or the like.

FIG. 12B depicts a profile view of a heat deflector, according to an embodiment of the invention. As depicted in FIG. 12B, mounting tab 720 may be configured at an angle to body portion 710 of heat deflector 700. The angle may be, for example, in a range of about 0 to 180 degrees with respect to body portion 710.

FIG. 12C is a perspective view of heat deflector 700 installed on bracket 500 attached to baffle filter 110, according to an embodiment of the invention. When installed, heat deflector 700 may be positioned at an angle with respect to the front face of baffle filter 110. In this manner, when the filter assembly is mounted or installed in exhaust hood 130, heat coming from the heating or cooking apparatus may be prevented from charring or burning disposable grease filter 120. For example, heat deflector 700 causes the hot air and cooking byproducts emanated in the air to flow around heat deflector 700, causing the heat to dissipate. Accordingly, in place of, or in addition to, a heat deflector mounted to the heating or cooking apparatus, heat deflector 700 may prevent heat from negatively impacting the filter apparatus in the exhaust hood.

In certain embodiments, optional heat deflector 700 may snap or clip into attachment slots 525 in bottom bracket 500. Thus, for example, no welding or drilling into baffle filter 110 or bottom bracket 500 may be required to attached heat deflector 700 to bottom bracket 500. In alternative embodiments, heat deflector 700 may be attached to baffle filter 110 via screws, bolts, nails, rivets, adhesive, welding, or other attachment means. In alternative embodiments, heat deflector 700 may be attached directly to baffle filter 110.

FIG. 12D depicts a rear view of a heat deflector, according to an embodiment of the invention. As depicted in FIG. 12D, mounting tabs 720 may be configured to extend beyond the surface edge of body portion 710 when viewed from the rear. Further, each of mounting tabs 720 may be spaced apart from each other by a predetermined distance along the lateral direction of body portion 710 of heat deflector 700. Mounting tab 720 may be configured to join with body portion 710 at an edge of body portion 710. In alternative embodiments, mounting tab 720 may be configured to join with body portion 710 at a non-edge, i.e., on the surface of body portion 710 a predetermined distance from an edge of body portion 710.

An embodiment of the present invention may be configured to support grease filters on the inside of the aperture opening of commercial kitchen exhaust hoods. The bracket may create a support for fiber-based grease filters in commercial kitchen exhaust hoods, or the like. The bracket may comprise metal and may include perforated holes, which may be spaced throughout the trough of the bracket for draining of fats, oils, grease, or the like that may collect in the trough. The profile of the bracket may include a substantially u-shaped edge, which may function as a type of hanger or clip. The substantially u-shaped edge may straddle the bottom lip of the exhaust flood's aperture opening, and may be oriented so that the trough of the bracket is protruding downstream to the airflow. This configuration may allow for all types of grease filters to rest inside the aperture opening, without requiring any welding or structural modifications. The bracket may be easily removed for cleaning and/or maintenance, and may be mounted, in place using a simple clip-on installation procedure. Thus, the removable bracket may create a support channel for grease filters, or the like, on the inside of an aperture opening of a commercial kitchen exhaust hood, or the like.

A process of mounting a filter may comprise inserting a disposable grease filter inside the aperture opening of a commercial kitchen exhaust hood, such that the installation process does not require welding, or the like, or any other type of structural modification in the existing exhaust hood canopy. A process of mounting a filter may comprise inserting a disposable grease filter in the channel of the bracket or plurality of brackets, which is attached to a baffle-type grease filter.

A process of mounting a filter may comprise placing a disposable grease pre-filter in front of a metal, baffle-type grease filter inside the aperture opening of a commercial kitchen exhaust hood. In such a configuration, no additional external or internal brackets or other attachment means may be required to hold the disposable grease pre-filter in place. Thus, a pre-filter may rest in front, or upstream, of the baffle-type grease filter with both filters positioned on the exhaust hood.

While the invention has been described in connection with several embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the claims below.

In an embodiment of the invention, a bracket comprises a clip portion, an attachment portion, and a support portion disposed between the clip portion and the attachment portion. In the bracket of this embodiment, the attachment portion may comprise a hole formed therein, and the clip portion may be substantially u-shaped.

In another embodiment of the invention, a bracket comprises a support portion configured to support a disposable filter, and a clip portion adjacent to the support portion. In the bracket of this another embodiment, the clip portion may be substantially u-shaped and the width of the support portion may correspond to the width of the disposable filter.

In a further embodiment of the invention, a filter comprises a baffle-type filter, a pre-filter adjacent to the baffle-type filter, and a bracket coupled to the baffle-type filter that is configured to support the pre-filter and be mounted to an exhaust hood. In the further embodiment of the invention, an upper bracket may also be coupled to the baffle-type filter and may be configured to support the pre-filter and be mounted to an exhaust hood.

In yet another embodiment of the invention, a method of mounting a filter comprises attaching a mounting bracket to a baffle-type filter, such that the mounting bracket mounts the baffle-type filter to an exhaust hood; and inserting a pre-filter adjacent to the baffle-type filter, such that the mounting bracket supports the pre-filter. In the yet another embodiment, the mounting bracket may comprise a clip portion, an attachment portion, and a support portion disposed between the clip portion and the attachment portion. Alternatively, in the yet another embodiment, the mounting bracket may comprise a support portion configured to support the pre-filter, and a clip portion adjacent to the support portion.

In still another embodiment of the invention, a filter assembly comprises: a support frame coupled to a filter pad, the support frame being configured to provide support to the filter pad to maintain the filter pad in a generally flat configuration; a filter pad comprising fibers selected from the group consisting of wool fibers, wood-based viscose fibers, and cellulose-based synthetic fibers, the fibers configured to absorb grease particulates; a baffle-type filter; and a bracket coupled to the baffle-type filter and configured to support the filter pad, wherein the bracket is configured to be mounted to an exhaust hood. In the still another embodiment, the filter assembly may comprise a plurality of brackets.

What is claimed is:
1. A filter assembly comprising:
a filter pad comprising fibers selected from the group consisting of wool fibers, wood-based viscose fibers, and cellulose-based synthetic fibers, the fibers configured to absorb grease particulates;
a baffle-type filter;
a support bracket configured to support the filter pad, the support bracket comprising:
a clip portion;
an attachment portion comprising a mounting hole formed in a surface thereof; and
a support portion arranged between the clip portion and the attachment portion, the support portion configured to support the disposable filter thereon;
wherein the clip portion is substantially u-shaped; and
a hanging bracket configured to support the filter pad therein, the hanging bracket comprising:
a front wall;
an attachment wall comprising a mounting hole formed in a surface thereof; and
a top wall arranged between the front wall and the attachment wall;

wherein the support bracket is configured to attach to the baffle-type filter via the attachment portion;
wherein the hanging bracket is configured to attach to the baffle-type filter via the attachment wall; and
wherein each of the support bracket and the hanging bracket is configured to mount the filter assembly to an exhaust hood.

2. The filter assembly according to claim 1, further comprising:
a heat deflector configured to deflect airflow and dissipate heat, the heat deflector comprising:
a body portion; and
one or more mounting tabs extending from the body portion and configured to be secured within one or more corresponding apertures of the support bracket.

3. The filter assembly according to claim 2, wherein:
the support bracket comprises an attachment slot formed therein; and
the mounting tab of the heat deflector is configured to engage with the attachment slot to couple the heat deflector to the support bracket.

4. A filter assembly comprising:
a support bracket configured to support a disposable filter, the support bracket comprising:
a clip portion;
an attachment portion comprising a mounting hole formed in a surface thereof; and
a support portion arranged between the clip portion and the attachment portion, the support portion configured to support the disposable filter thereon;
wherein the clip portion is substantially u-shaped.

5. The filter assembly according to claim 4, wherein a width of the support portion substantially corresponds to a thickness of the disposable filter.

6. The filter assembly according to claim 4, wherein the clip portion comprises:
a first side wall;
a second side wall; and
a connecting wall arranged between the first side wall and the second sidewall;
wherein the first side wall and the second side wall are substantially parallel; and
wherein the connecting side wall is substantially perpendicular to the first side wall and the second side wall.

7. The filter assembly according to claim 4, wherein the support bracket is configured to attach to a baffle filter via the attachment portion, such that the disposable filter supported by the support portion is arranged adjacent to the baffle filter.

8. The filter assembly according to claim 4, wherein the clip portion is configured to attach to an exhaust hood to mount the support bracket to the exhaust hood.

9. The filter assembly according to claim 4, further comprising:
a hanging bracket configured to support a disposable filter therein, the hanging bracket comprising:
a front wall;
an attachment wall comprising a mounting hole formed in a surface thereof; and
a top wall arranged between the front wall and the attachment wall;
wherein the hanging bracket is configured to attach to a baffle filter via the attachment wall.

10. The filter assembly according to claim 9, wherein the hanging bracket is configured to attach to an exhaust hood.

11. The filter assembly according to claim 10, wherein:
the front wall and the attachment wall are substantially parallel; and
the top wall is substantially perpendicular to the front wall and the attachment wall.

12. The filter assembly according to claim 4, wherein the clip portion comprises:
a first side wall;
a second side wall; and
a connecting wall arranged between the first side wall and the second sidewall;
wherein the connecting wall comprises an attachment slot formed therein configured to receive an attachment tab of a heat deflector.

13. The filter assembly according to claim 4, wherein the support portion comprises a drain hole formed therein, the drain hole being configured to pass accumulated cooking media therethrough.

14. The filter assembly according to claim 4, further comprising:
a heat deflector configured to deflect airflow and dissipate heat, the heat deflector comprising:
a body portion; and
a mounting tab connected to the body portion;
wherein the heat deflector is configured to attach to the support bracket via the mounting tab.

15. The filter assembly according to claim 14, wherein:
the support bracket comprises an attachment slot formed therein; and
the mounting tab of the heat deflector is configured to engage with the attachment slot to couple the heat deflector to the support bracket.

16. The filter assembly according to claim 14, wherein the body portion of the heat deflector is angled with respect to the attachment portion.

17. The filter assembly according to claim 4, further comprising:
a hanging bracket configured to support a disposable filter therein, the hanging bracket comprising:
a clip portion;
an attachment portion comprising a mounting hole formed in a surface thereof; and
a support portion arranged between the clip portion and the attachment portion, the support portion configured to support the disposable filter therein;
wherein the clip portion is substantially u-shaped.

18. The filter assembly according to claim 17, wherein the clip portion comprises:
a first side wall;
a second side wall; and
a connecting wall arranged between the first side wall and the second sidewall;
wherein the first side wall and the second side wall are substantially parallel;
wherein the connecting side wall is substantially perpendicular to the first side wall and the second side wall; and
wherein a width of the support portion substantially corresponds to a thickness of the disposable filter.

19. A support bracket configured to support a filter assembly, the support bracket comprising:
a substantially u-shaped clip portion configured to receive a first portion of an exhaust hood and secure the filter assembly within the exhaust hood;
an attachment portion comprising one or more mounting holes formed in a surface thereof, wherein the attachment portion is configured to attach a baffle filter of the filter assembly via the one or more mounting holes; and
a support portion arranged between the clip portion and the attachment portion, the support portion supporting a disposable filter of the filter assembly thereon,
wherein the disposable filter supported by the support portion is arranged adjacent to the baffle filter.

20. The bracket assembly of claim 19, further comprising a hanging bracket configured to support a disposable filter therein, the hanging bracket comprising:
a front wall;
an attachment wall comprising a mounting hole formed in a surface thereof; and
a top wall arranged between the front wall and the attachment wall;
wherein the hanging bracket is configured to attach to a baffle filter via the attachment wall.

* * * * *